United States Patent
Hitz et al.

(10) Patent No.: US 6,457,130 B2
(45) Date of Patent: *Sep. 24, 2002

(54) FILE ACCESS CONTROL IN A MULTI-PROTOCOL FILE SERVER

(75) Inventors: David Hitz, Portola Valley, CA (US); Andrea Borr, Los Gatos, CA (US); Robert J. Hawley, San Jose, CA (US); Mark Muhlestein, Morgan Hill, CA (US); Joan Pearson, Menlo Park, CA (US)

(73) Assignee: Network Appliance, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,234

(22) Filed: Mar. 3, 1998

(51) Int. Cl.[7] ................................................. G06F 11/00
(52) U.S. Cl. ........................................ 713/201; 714/38
(58) Field of Search ................................. 713/201, 200, 713/202; 714/38, 39, 47; 340/825.31, 825.34; 395/609, 610, 600; 380/25, 49, 4, 23; 711/163, 164

(56) References Cited

U.S. PATENT DOCUMENTS 3,813,529 A    5/1974    Bartlett (List continued on next page.)

FOREIGN PATENT DOCUMENTS

| EP | 0308056 A2 | 8/1988 |
|---|---|---|
| EP | 0306244 A2 | 3/1989 |
| EP | 0306244 A2 | 3/1989 |
| EP | 0308056 A2 | 3/1989 |
| EP | 0321723    | 6/1989 |
| EP | 0359384 A2 | 3/1990 |

(List continued on next page.)

OTHER PUBLICATIONS

AT & T—UNIX System V Release 4 Programmer's Guide: Streams.

AT & T Bell Laboratories Technical Journal. vol. 63 No. 08. Part 02. Dated: Ocotber 1984.

Bach, Maurice J. et al "The Design of the UNIX Operating System".

(List continued on next page.)

Primary Examiner—Nadeem Iqbal
(74) Attorney, Agent, or Firm—Swernofsky Law Group PC (57) ABSTRACT

The invention provides a method and system for enforcing file access control among client devices using multiple diverse access control models and multiple diverse file server protocols. A multi-protocol file server identifies each file with one particular access control model out of a plurality of possible models, and enforces that one particular model for all accesses to that file. When the file server receives a file server request for that file using a different access control model, the file server translates the access control limits for that file into no-less-restrictive limits in the different model. The file server restricts access by the client device using the translated access control limits. Each file is assigned the access control model of the user who created the file or who last set access control limits for the file. When a user having a different access control model sets access control limits, the access control model for the file is changed to the new model. Files are organized in a tree hierarchy, in which each tree is limited to one or more access control models (which can limit the ability of users to set access control limits for files in that tree). Each tree can be limited to NT-model-only format, Unix-model-only format, or mixed NT-or-Unix-models format.

60 Claims, 1 Drawing Sheet

U.S. PATENT DOCUMENTS

| | | |
|---|---|---|
| 3,893,024 A | 7/1975 | Reins et al. |
| 4,075,691 A | 2/1978 | Davis et al. |
| 4,075,704 A | 2/1978 | O'Leary |
| 4,156,907 A | 5/1979 | Rawlings |
| 4,333,144 A | 6/1982 | Whiteside |
| 4,351,023 A | 9/1982 | Richer |
| 4,377,843 A | 3/1983 | Garringer |
| 4,399,503 A | 8/1983 | Hawley |
| 4,456,957 A | 6/1984 | Schieltz |
| 4,459,664 A | 7/1984 | Pottier |
| 4,488,231 A | 12/1984 | Yu et al. |
| 4,494,188 A | 1/1985 | Nakane |
| 4,527,232 A | 7/1985 | Bechtolsheim |
| 4,550,368 A | 10/1985 | Bechtlosheim |
| 4,589,067 A | 5/1986 | Porter et al. |
| 4,620,292 A | 10/1986 | Hagiwara |
| 4,685,125 A | 8/1987 | Zave |
| 4,710,868 A | 12/1987 | Cocke et al. |
| 4,719,569 A | 1/1988 | Ludemann |
| 4,742,447 A | 5/1988 | Duvall et al. |
| 4,742,450 A | 5/1988 | Duvall et al. |
| 4,761,737 A | 8/1988 | Duvall et al. |
| 4,761,785 A | 8/1988 | Clark et al. |
| 4,766,534 A | 8/1988 | DeBenedicts |
| 4,780,821 A | 10/1988 | Crossley |
| 4,783,730 A | 11/1988 | Fischer |
| 4,803,621 A | 2/1989 | Kelly |
| 4,819,159 A | 4/1989 | Shipley et al. |
| 4,825,354 A * | 4/1989 | Agrawal et al. ............ 364/200 |
| 4,827,411 A | 5/1989 | Arrowood |
| 4,845,609 A | 7/1989 | Lighthart et al. |
| 4,875,159 A | 10/1989 | Cary et al. |
| 4,887,204 A | 12/1989 | Johnson et al. |
| 4,897,781 A | 1/1990 | Chang et al. |
| 4,914,583 A | 4/1990 | Weisshaar |
| 4,965,772 A | 10/1990 | Daniel et al. |
| 4,969,118 A | 11/1990 | Montoye et al. |
| 4,984,272 A * | 1/1991 | Mellroy et al. ............... 380/25 |
| 5,001,628 A | 3/1991 | Johnson et al. |
| 5,001,712 A | 3/1991 | Slpett et al. |
| 5,008,786 A | 4/1991 | Thatte |
| 5,018,144 A | 5/1991 | Corr et al. |
| 5,043,871 A | 8/1991 | Nishigaki |
| 5,043,876 A | 8/1991 | Terry |
| 5,049,873 A | 9/1991 | Robins et al. |
| 5,107,500 A | 4/1992 | Wakamoto |
| 5,113,442 A * | 5/1992 | Moir ........................... 380/25 |
| 5,134,619 A | 7/1992 | Henson et al. |
| 5,144,659 A * | 9/1992 | Jones ............................ 380/4 |
| 5,146,588 A | 9/1992 | Crater et al. |
| 5,155,835 A | 10/1992 | Belsan |
| 5,163,131 A | 11/1992 | Row et al. |
| 5,163,148 A | 11/1992 | Walls |
| 5,182,805 A | 1/1993 | Campbell |
| 5,195,100 A | 3/1993 | Katz et al. |
| 5,202,983 A * | 4/1993 | Orita et al. ................. 395/600 |
| 5,208,813 A | 5/1993 | Stallmo |
| 5,218,695 A | 6/1993 | Noveck et al. |
| 5,218,696 A | 6/1993 | Baird et al. |
| 5,222,217 A | 6/1993 | Blount et al. ............... 395/325 |
| 5,235,601 A | 8/1993 | Stallmo et al. |
| 5,251,308 A | 10/1993 | Frank |
| 5,255,270 A | 10/1993 | Yanai et al. |
| 5,261,044 A | 11/1993 | Dev et al. |
| 5,261,051 A | 11/1993 | Masden et al. |
| 5,274,799 A | 12/1993 | Brant et al. |
| 5,274,807 A | 12/1993 | Hoshen et al. |
| 5,276,840 A | 1/1994 | Yu |
| 5,276,867 A | 1/1994 | Kenley et al. |
| 5,283,830 A * | 2/1994 | Hinsley et al. ............... 380/25 |
| 5,297,265 A | 3/1994 | Frank et al. |
| 5,305,326 A | 4/1994 | Solomon et al. |
| 5,313,626 A | 5/1994 | Jones et al. |
| 5,313,646 A | 5/1994 | Hendricks |
| 5,313,647 A | 5/1994 | Kaufman |
| 5,315,602 A | 5/1994 | Noya et al. |
| 5,317,731 A | 5/1994 | Dias et al. |
| 5,333,305 A | 7/1994 | Neufeld |
| 5,335,235 A | 8/1994 | Arnott |
| 5,355,453 A | 10/1994 | Row et al. |
| 5,357,509 A | 10/1994 | Ohizumi |
| 5,357,612 A | 10/1994 | Alaiwan |
| 5,377,196 A | 12/1994 | Godlew et al. |
| 5,379,417 A | 1/1995 | Lui et al. |
| 5,430,729 A | 7/1995 | Rahnema |
| 5,454,095 A | 9/1995 | Kraemer et al. |
| 5,463,642 A | 10/1995 | Gibbs et al. |
| 5,485,455 A | 1/1996 | Dobbins et al. |
| 5,490,248 A | 2/1996 | Dan et al. |
| 5,497,343 A | 3/1996 | Rarick |
| 5,502,836 A | 3/1996 | Hale et al. |
| 5,504,883 A | 4/1996 | Coverston et al. |
| 5,519,844 A | 5/1996 | Stallmo |
| 5,535,375 A | 7/1996 | Eshel et al. |
| 5,555,244 A | 9/1996 | Gupta et al. |
| 5,572,711 A * | 11/1996 | Hirsch et al. ................ 395/500 |
| 5,574,843 A | 11/1996 | Gerlach, Jr. |
| 5,604,862 A | 2/1997 | Midgely et al. ........ 395/182.04 |
| 5,604,868 A | 2/1997 | Komine et al. |
| 5,617,568 A * | 4/1997 | Ault et al. ................... 389/612 |
| 5,621,663 A | 4/1997 | Skagerling |
| 5,627,842 A | 5/1997 | Brown et al. |
| 5,628,005 A | 5/1997 | Hurvig |
| 5,630,060 A | 5/1997 | Tang et al. |
| 5,634,010 A | 5/1997 | Ciscon et al. |
| 5,642,501 A | 6/1997 | Doshi et al. |
| 5,644,718 A | 7/1997 | Belove et al. |
| 5,649,152 A | 7/1997 | Ohran et al. ................. 395/441 |
| 5,649,196 A | 7/1997 | Woodhill et al. ............ 395/620 |
| 5,666,353 A | 9/1997 | Klausmeiser |
| 5,668,958 A | 9/1997 | Bendert et al. ............. 710/128 |
| 5,673,265 A | 9/1997 | Gupta et al. |
| 5,675,726 A | 10/1997 | Hohenstein et al. |
| 5,675,782 A * | 10/1997 | Montague et al. .......... 395/609 |
| 5,678,006 A | 10/1997 | Valizadeh |
| 5,678,007 A | 10/1997 | Hurvig |
| 5,689,701 A * | 11/1997 | Ault et al. ................... 395/610 |
| 5,694,163 A | 12/1997 | Harrison |
| 5,696,486 A | 12/1997 | Poliquin et al. |
| 5,720,029 A | 2/1998 | Kern et al. |
| 5,721,916 A | 2/1998 | Pardikar ...................... 395/617 |
| 5,737,523 A * | 4/1998 | Callaghan et al. ...... 395/187.01 |
| 5,737,744 A | 4/1998 | Callison et al. |
| 5,742,752 A | 4/1998 | DeKoning |
| 5,754,851 A | 5/1998 | Wissner |
| 5,761,669 A * | 6/1998 | Montague et al. ........... 707/103 |
| 5,819,292 A | 10/1998 | Hitz et al. ................... 707/203 |
| 5,819,310 A | 10/1998 | Vishlitzky .................... 711/114 |
| 5,825,877 A * | 10/1998 | Dan et al. ........................ 380/4 |
| 5,826,102 A | 10/1998 | Escobar et al. |
| 5,828,839 A | 10/1998 | Moncreiff |
| 5,835,953 A | 11/1998 | Ohran ......................... 711/162 |
| 5,854,893 A | 12/1998 | Ludwig et al. |
| 5,854,903 A | 12/1998 | Morrison et al. |
| 5,856,981 A | 1/1999 | Voelker |
| 5,876,278 A | 3/1999 | Cheng ......................... 454/184 |
| 5,890,959 A | 4/1999 | Pettit et al. .................. 454/184 |
| 5,915,084 A | 6/1999 | Hammond et al. ..... 395/187.01 |
| 5,915,087 A * | 6/1999 | Hammond et al. ..... 395/187.01 |
| 5,931,935 A * | 8/1999 | Cabrera et al. ............. 710/260 |
| 5,950,225 A | 9/1999 | Kleiman |

| | | | |
|---|---|---|---|
| 5,956,491 A | 9/1999 | Marks | |
| 5,956,712 A | 9/1999 | Bennett et al. | |
| 5,957,612 A | 9/1999 | Bradley | |
| 5,963,962 A | 10/1999 | Hitz et al. | 707/202 |
| 5,983,364 A | 11/1999 | Bortcosh et al. | |
| 5,996,086 A | 11/1999 | Delaney et al. | 714/4 |
| 5,996,106 A | 11/1999 | Seyyedy | |
| 5,999,943 A | 12/1999 | Nori et al. | 707/104 |
| 6,000,039 A | 12/1999 | Tanaka et al. | |
| 6,044,214 A | 3/2000 | Kimura et al. | |
| 6,070,008 A | 5/2000 | Korenshtein | |
| 6,073,089 A | 6/2000 | Baker et al. | |
| 6,076,148 A | 6/2000 | Kedem | |
| 6,101,585 A | 8/2000 | Brown et al. | |
| H1860 H | 9/2000 | Asthana et al. | |

FOREIGN PATENT DOCUMENTS

| | | | |
|---|---|---|---|
| EP | 0359384 B1 | 3/1990 | |
| EP | 0359384 A3 | 3/1990 | |
| EP | 0410630 A3 | 1/1991 | |
| EP | 0410630 A | 1/1991 | |
| EP | 0410630 A2 | 1/1991 | |
| EP | 0453193 A3 | 10/1991 | |
| EP | 0462917 B1 | 12/1991 | |
| EP | 0462917 A3 | 12/1991 | |
| EP | 0462917 A2 | 12/1991 | |
| EP | 0477 039 A2 | 3/1992 | |
| EP | 0477039 A3 | 3/1992 | |
| EP | 0 477 039 A | 3/1992 | |
| EP | 0497067 | 8/1992 | |
| EP | 0537098 A2 | 4/1993 | |
| EP | 0537198 B1 | 4/1993 | |
| EP | 0552580 A2 | 7/1993 | |
| EP | 0552580 A3 | 7/1993 | |
| EP | 0566967 A | 10/1993 | |
| EP | 0566967 A3 | 10/1993 | |
| EP | 0569313 | 11/1993 | |
| EP | 0569313 A2 | 11/1993 | |
| EP | 629956 A2 | 12/1994 | |
| EP | 629956 A3 | 12/1994 | |
| EP | 747829 A | 12/1996 | |
| EP | 756235 A | 1/1997 | |
| EP | 0760503 A1 | 3/1997 | |
| JP | 1-273395 | 11/1989 | 361/695 |
| JP | 1273395 | 11/1989 | |
| WO | WO 89/03086 | 4/1989 | |
| WO | WO 91/13404 | 9/1991 | |
| WO | WO 92/00834 | 1/1992 | |
| WO | WO 91/13475 | 7/1993 | |
| WO | WO 94/29795 | 12/1994 | |
| WO | WO 94/29796 | 12/1994 | |
| WO | WO 94/29807 | 12/1994 | |
| WO | WO 9821656 A | 5/1998 | |
| WO | WO 98/38576 | 9/1998 | |
| WO | WO 99/30254 | 6/1999 | |
| WO | WO 99/45456 | 9/1999 | |
| WO | WO 99/46680 | 9/1999 | |
| WO | WO 99/66401 | 12/1999 | |
| WO | WO 00/07104 | 2/2000 | |
| WO | WO 00/11553 | 3/2000 | |

OTHER PUBLICATIONS

Beach, Richard J. "The Message is the Medium: Multiprocess Structuring of an Interactive Paint Program". pp.: 277–287.

Borr, AJ "Secure Share: Safe Unix/Windows File Sharing Through Multiprotocal Locking". USENIX Association. pp. 117–126.

Britton, Diane E. & Mark E. Stockel. "An Interprocess Communication Facility for Distributed Applications". IEEE. 1980. pp.: 590–595.

Carlson, et al "HP AdvanceNet: A growth–Oriented Computer Networking Architecture Strategy". Hewlett–Packard Journal. Oct. 1986.

Carr, Robert & Dan Shafer. "The Power of PENPOINT".

Cashin, P.M. "Inter–Process Communication". May 1980.

Chao, Chia et al "Mime: A High performance Storage Device With Strong Recovery Guarantees". Dated: Mar. 18, 1992.

Cheriton, David R. Multi–Process Structuring and the Thoth Operating System. 1979. pp.: 1–64.

Cheriton, David R. "The Thoth System: Multi–Process Structuring and Portability".

Cheriton, David R. et al "Thoth, A Portable real–Time Operating System". pp.: 105–115.

Chutani, Sailesh et al "The Episode File System". UNIX. Winter 1992. pp.: 43–60.

CIFS: Common Internet File System. UNIX Review. Feb. 1997.

Cohen, Jacques. "Garbage Collection of Linked Data Structures". Computing Surveys. Vol. 13. No. 03. Dated: Sep. 1981.

Computer. IEEE. Sep. 1988.

De Jonge, Wiebren et al "The Logical Disk: A New Approach to Improving File System". pp.: 1–14.

Deitel, Harvey M. "An Introduction to Operating Systems".

English, Robert M. & Alexander A Stepanov. 'LOGE: A Self–Organizing Disk Controller. Dec. 1991. pp.: 1–15.

FLY–BY–XOR. Specification.

Hammond, Richard A. "Experiences With A Series/1 Distributed System". pp.: 585–589.

Hanson, Per Brinch (Editor). RC 4000 Software Multiprogramming System. Apr. 1969.

Hartman, John H. & John K. Ousterhout. "The Zebra Striped Network File System".

Hewlett–Packard Journals. vol. 37. No. 10. Oct. 1986.

Hitz, David et al "Using UNIX as One Component of a Lightweight Distributed Kernal for Multiprocessor File Servers".

Hitz, David, James Lau & Michael Malcolm. "File System Design for an NFS File Server Appliance". Dated: Jan. 19, 1994.

Hitz, David. "A System Administrator's Performance Monitor for Tuning NFS Network Servers". Dated: May 1991.

Hitz, David. "Technical Report TR01: An NFS File Server Appliance". Rev. A 8/93.

Jones, Anita K. et al "StarOS, a Multiprocessor Operating System for the Support of Task Forces".

Kleiman. "Using NUMA Interconnects for a Highly Available Filers". IEEE Micro. 1999. pp.: 42–48.

Lantz, Keith A. et al "Rochester's Intelligent Gateway". IEEE. Oct. 1982.

Leffler, Samuel J. et al "The Design and Implementation of the 4.3 BSD UNIX Operating System".

Lieberman, Henry & Carl Hewitt. "A Real–Time Garbage Collector Based on the Lifetime of Objects". Communication of the ACM. vol. 26. No. 06. Dated: Jun. 1983.

Malcolm, Michael A. "A Process and Its Application". Dated: 1978.

Montoye R.K. et al Microprocessors Session 3 WPM 3.4 "An 18ns 56–Bit Multiply–Adder Circuit". IEEE. Feb. 14, 1990.

Motorola, inc. "Microsystems Products Technical Data Sheet (1986), MicroMAP1–7, MicroMAP Manufacturing Automation Protocol Software".

Nass, Richard "Connect Disk Addays To EISA or PCI Buses". Electronic Design. Nov. 11, 1993.

Nelson, Bruce & Yu–Ping Cheng "The Myth of transfer Rate–How and Why SCSI is Better than IPI for NFS". Dated: Jul. 1992.

Nelson, Bruce et al "The Myth of MIPS for I/O–An Overview of Functional Multiprocessing for NFS Network Servers". Dated: Aug. 1992.

Nelson, Bruce "Benchmark Methodology and Preliminary Performance Specifications for the Auspex NS 5000 Network Server". Dated: Oct. 1989.

Network Appliance–Data ONTAP Event management System. Aug. 10, 2000.

Network Interfaces Programmer's Guide. Sun Microsystems, Inc. 1992.

Optical Backplanes Driven By Sebring Rings Can Supply 40–160 Terabits/Sec of Wire–Speed Routing By 2002.

Optipat Document Delivery. Feb. 2, 2000. pp.:02.

Osadzinski, Alex "The Network File System (NFS)".

Ousterhout, John & Fred Douglas "Beating the I/O Bottleneck: A Case for the Log–Structured File Systems".

Patterson, David A. et al "A Case for Redundant Arrays of Inexpensive Disks (RAID)".

Plum, Thomas "Reliable Data Structures In C".

Rashid, Richard F. et al "Accent: A Communication Oriented Network Operating System Kernal".

Robertazzi, Thomas G. Computing Networks and Systems: Queueing Theory and performance Evaluatio.

Row, John & Dvid Daugherty "Operating System Extensions Link Disparate Systems". Computer Design. Dated: Jul. 1984.

Row, John "Lan Software Links Diverse Mamchines, OS's" Mini–Mirco Systems. Dated: Sep. 1985.

Sandberg, Russel "The SUN Network File System: Design, Implementation and Experience".

Schroeder W. "PEACE: The Distributed SUPRENUM Operating System".

Scwartz, Allan M., David Hitz & William M. Pitts. "LFS–A Local File System for Multiprocessor NFS Network Servers". Dated: Dec. 1989.

Sebring Rings in Networking. Aug. 9, 1999.

Sebring Theory of Ring Operation (STROP). Septemebr 9, 1999.

Seltzer, Margo Ilene File System Performance and Transaction Support. 1992.

Session, Roger Class Construction in C and C++ Object–Oriented Programming Fundamentals. 1992.

Silberschatz, Abraham & James L. Peterson Operating System Concepts. 1989.

Sincoskie, W. David & David J. Farber The Series/1 Distributed Operating System: Description and Comments.

SRC 6466 External Architecture Specification Rev. 0.7. May 5, 1999.

SRC 6466 Protocol Specification, Rev. 0.9, Draft. Aug. 16, 1999.

Srinivasan, B. Recoverable File System for.

Stallings, William 5th Edition–Data and Computer Communications. 1997.

Stern, Hal "Managing NFS and NIS". O'Reilly & Associates, Inc. 1991.

Tan, See–Mong, Harvard Holmes, & Craig Eades. SOS–Stan's Own Server–A NFS File Server for the IBM PC.

Tanenbaum, Andrew S. Operating Systems–Design and Implementation. 1987.

Tanner, J. "CIFS: Common Internet File System". UNIX Review. vol. 31. Feb. 1997. pp.: 31–32, 34, 36–41. XP000783952.

Tribby, David M. Network Services for HP Real–Time Computers. Hewlett–Packard Journal. Oct. 1996.

TUX 2: Slashdot.com TUX 2: The File System That Woulf Be King. Dated: Oct. 17.

Tweten, David Hiding Mass Storage Under UNIX: NASA's MSS–II Architecture. IEEE. 1990.

UI–ATLAS–Distributed Computing Architecture: A Technical Overview. Oct. 1991.

USENIX Association. Proceedings of the Winter 1992 USENIX Conference. San Francisco, CA. Jan. 20–24, 1992.

VRTX C User's Guide. Jan. 1987.

VRTX32/68020 Versatile Real–Time Executive for the MC68020 Microprocessor. Dated: Apr. 1987.

Walton, Robert L. Rationble for a Queueable Object Distributed Interprocess Communication System. IEEE. 1982.

Wood, B.J. et al A Local–Area Network Architecture Based on message–Passing Operating System Concepts.

"Mapping the VM text files to the AIX text files", IBM Technical Disclosure Bulletin., vol. 33, No. 2, Jul. 1990, p. 341 XP000123641, IBM Corp. New York., US ISSN: 0018–8689–the whole document.

"Migrated Data Backup Utility", IBM Technical Disclosure Bulletin., vol. 37, No. 06B, Jun. 1994, pp. 505–507, XP000456079, IBM Corp. New York., US ISSN: 0018–8689.

R. Reichel: "Inside Windows NT Security: Part 1" Windows/DOS Developers' Journal, vol. 4, No. 4, Apr. 1993, pp. 6–19, XP002107445, Lawrence, Ks, USA.

Borr A J: "SecureShare: safe Unix/Windows file sharing through multiprotocol locking" Proceeding of the 2nd Usenix Windows NT Symposiom, proceedings of 2nd Usenix Windows NT Symposiom, Seattle, WA, USA, Aug. 3–5, 1998, pp. 117–126, XP002097387 ISBN 1–880446–95–2, 1998, Berkeley, CA, USA, Usenix Assoc. USA.

Tanner J: "CIFS: Common Internet File System" Unix Review, vol. 31, Feb. 1997, pp. 31/32, 34, XPOOO783952 see whole document, relevant to claim No. 1–38.

R. Nass: Connect Disk Arrays to Eisa or PCI Buses Electronic Design, vol. 41, No. 23, Nov. 1993, Cleveland, OH, USA pp. 152–154, XP000417908 see pp. 152—153, right–hand col., line 10.

* cited by examiner

FIG. 1

FILE ACCESS CONTROL IN A MULTI-PROTOCOL FILE SERVER

BACKGROUND OF THE INVENTION

1. Field of the Invention

The invention relates to file access control in a multi-protocol file server.

2. Related Art

In an integrated computer network, it is desirable for multiple client devices to share access to the same files. One known method is to provide a network file server for storing files, capable of receiving and responding to file server requests from those client devices. These file server requests are made using a file server protocol, which is recognized and adhered to by both the file server and the client device. Because the files are stored at the file server, multiple client devices have the opportunity to share access to the same files.

In a file system intended for use by more than one user, it is desirable to restrict access by programs to files in the file system. Restricting access includes at least the aspects of (1) user authentication—determining that requesting users are truly who they say they are, and (2) access control validation—determining that an authenticated user is allowed to access a particular file in a particular way. When the file system is maintained on a file server remote from the user making the request, there is an additional aspect of the access control protocol—what requests can be made by the user to access files or to set access control for files.

One problem in the known art is that there are multiple diverse models for access control validation, each typically associated with a particular file system, and there are multiple diverse access control protocols, each typically corresponding to a model for access control validation. Despite the differences between these models and protocols, the file server should respond to file server requests from each user, and should exhibit access control validation behavior, consistent with each user's model and without security violations or surprises for users.

For example, a first access control model in common use is associated with the Unix operating system (or a variant thereof). This first access control model associates permissions with each file for a file owner, an owner's group, and all other users. These permissions allow access (for the owner, group, or all other users) to read, write, or execute the indicated file. This first access control model is typically implemented by the NFS ("Network File System") file server protocol, possibly augmented with an adjunct file-locking protocol, NLM ("Network Lock Manager"). A second access control model in common use is associated with the Windows NT operating system. This second access control model associates an ACL (access control list) with each file, each entry in the ACL specifying an individual user, a group of users, or all users. Each entry can allow access (for the specified users) to read, write, or execute the indicated file, or can specifically deny access. This second access control model is typically implemented by the CIFS ("Common Internet File System") protocol. However, NT devices can also use the NFS protocol by means of the "PC NFS" implementation, and Unix devices can also manipulate POSIX ACLs. These two access control models in common use differ in significant ways, including (1) what permissions can be assigned to a file, (2) with what granularity of specificity permissions can be assigned, and (3) how users are identified so as to match them with permissions.

One method known in the art is to provide a multi-protocol file server that maps all security semantics to that of a single native operating system for the file server, and uses that single native operating system to validate file access control. The "Samba" system and similar emulation packages are believed to use this known method. This known method has the drawback that it can result in security errors or surprises for those client devices using security semantics other than the file server's native operating system.

Another method known in the art is to provide a multi-protocol file server that supports differing types of security semantics for differing files, but attempts to validate file access control for each user using the user's access control model. Some "Netware" products available from Novell Corporation are believed to use this known method. This known method has the drawback that the user's access control model can differ significantly from the access control model set for the file, resulting in security errors or surprises for those client devices using security semantics other than associated with the target file.

Accordingly, it would be desirable to provide a method and system for enforcing file security semantics among client devices using multiple diverse access control models and multiple diverse file server protocols. This advantage is achieved in an embodiment of the invention in which a multi-protocol file server identifies each file with one particular access control model out of a plurality of possible access control models, and enforces that particular access control model for all accesses to that file. When the file server receives a file server request for that file using a file server protocol with a different access control model, the file server translates the access control limits imposed by the file's access control model into no-less-restrictive access control limits in the different access control model. The file server restricts access to the file using the translated access control limits.

SUMMARY OF THE INVENTION

The invention provides a method and system for enforcing file access control among client devices using multiple diverse access control models and multiple diverse file server protocols. A multi-protocol file server identifies each file with one particular access control model out of a plurality of possible models, and enforces that one particular model for all accesses to that file. When the file server receives a file server request for that file using a different access control model, the file server translates the access control limits for that file into no-less-restrictive limits in the different model. The file server restricts access by the client device using the translated access control limits.

In a preferred embodiment, each file is assigned the access control model of the user who created the file or who last set access control limits for the file. When a user having a different access control model sets access control limits, the access control model for the file is changed to the new model. Files are organized in a tree hierarchy, in which each tree is limited to one or more access control models (which can limit the ability of users to set access control limits for files in that tree). Each tree can be limited to NT-model-only format, Unix-model-only format, or mixed NT-or-Unix-models format.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, and that implementation of the preferred process steps and data structures described herein using such equipment would not require undue experimentation or further invention.

Inventions described herein can be used in conjunction with inventions described in the following applications:

application Ser. No. 08/985,398, filed Dec. 5, 1997, in the name of Andrea Borr, titled "Multi-Protocol Unified File-locking".

This application is hereby incorporated by reference as if fully set forth herein.

The enclosed technical appendix is part of the disclosure of the invention, and is hereby incorporated by reference as if fully set forth herein.

System Elements

Figure 1:
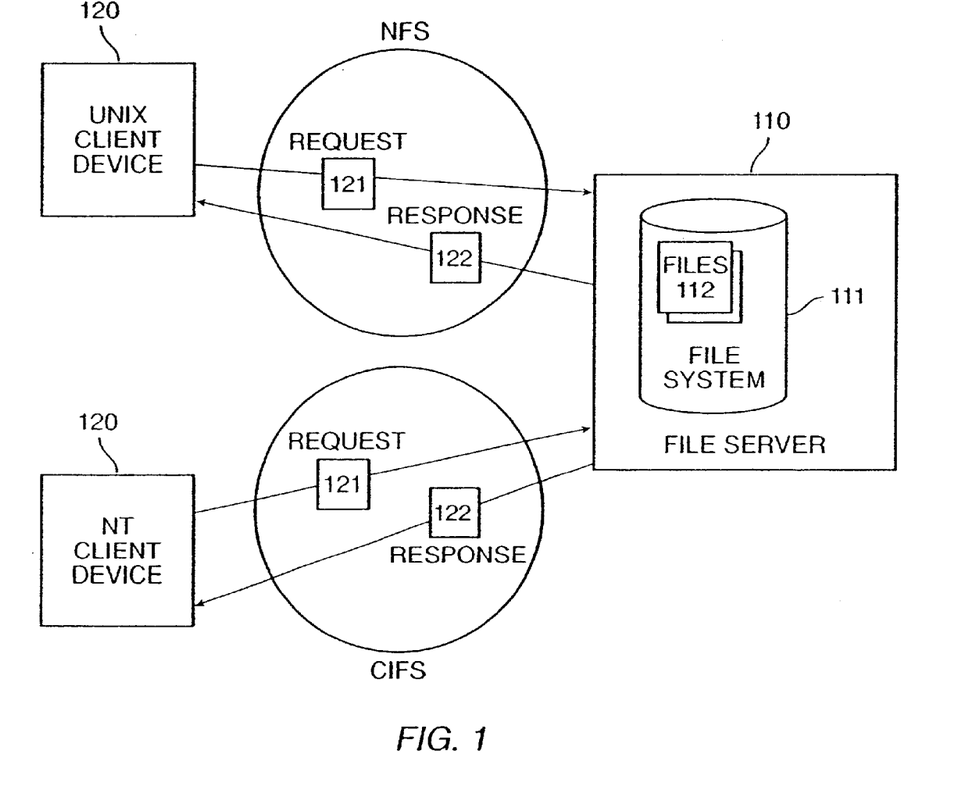
The figure shows a block diagram of a system for enforcing diverse access control models among client devices.

The figure shows a block diagram of a system for enforcing diverse access control models among client devices.

A system 100 includes a file server 10, and a set of client devices 120.

The file server 110 maintains a file system 111, including a set of files 112.

In a preferred embodiment, the file server 110 maintains the file system 111 using inventions described in the following patent applications:

application Ser. No. 08/471,218, filed Jun. 5, 1995, in the name of inventors David Hitz et al., titled "A Method for Providing Parity in a Raid Sub-System Using Non-Volatile Memory".

application Ser. No. 08/454,921, filed May 31, 1995, in the name of inventors David Hitz et al., titled "Write Anywhere File-System Layout".

application Ser. No. 08/464,591, filed May 31, 1995, in the name of inventors David Hitz et al., titled "Method for Allocating Files in a File System Integrated with a Raid Disk Sub-System".

Each of these applications is hereby incorporated by reference as if fully set forth herein.

The file server 110 is disposed for receiving file server requests 121 from the client devices 120. The file server 110 parses each request 121, determines whether the operation requested in the request 121 is allowed (for the client device 120 that sent the request 121 and for the one or more target files 112 specified by the request 121). If allowed, the file server 110 performs that operation on the one or more target files 112.

The file server 110 is also disposed for transmitting file server responses 122 to the client devices 120. The file server 10 determines the response to each request 121 (possibly including a response indicating that the requested operation was not allowed), generates that response 122, and transmits that response 122 to the client device 120 that sent the request 121.

Each client device 120 is disposed for transmitting file server requests 121 to the file server 110, and for receiving file server responses 122 from the file server 110.

Access Control Models

In a preferred embodiment, each client device 120 can be either a Unix client device 120 or a Windows NT client device 120. Each client device 120 can either use the NFS file server protocol to make requests 121, or use the CIFS file server protocol to make requests 121. (Although typically Unix client devices 120 use the NFS file server protocol and NT client devices 120 use the CIFS file server protocol, it is possible for NT client devices 120 to use the NFS file server protocol by using the PC-NFS implementation of that file server protocol.) The file server 110 receives each request 121 and (if allowed) performs the requested operation on the target files 112 specified by the request 121.

The file server 110 supports more than one access control model, including a "Unix Perms" access control model (herein "Unix security style") and an "NT ACL" access control model (herein "NT security style").

Unix security style uses user IDs (UIDs) to identify users, and group IDs (GIDs) to identify groups to which those users belong. Unix security style associates the following access control limits with each file:

a UID for the owner;

a GID for the owner;

a set of "user" permissions—allowing permission to read, write, or execute the file by the owning user;

a set of "group" permissions—allowing permission to read, write, or execute the file by the owning user's group; and a set of "other" permissions—allowing permission to read, write, or execute the file by all other users.

Unix security style is supported by the NFS ("Network File System") file server protocol, possibly augmented with the NLM ("Network Lock Manager") adjunct file-locking protocol.

NFS is a stateless protocol, so each NFS file server request 121 includes the UIDs and GIDs of the user making the request. The Unix client device 120 determines the UIDs and GIDs for the user at a login time for the user, by reference to the system password file (/etc/passwd) and group file (/etc/groups).

To enforce file access control using Unix security style, the file server 110 determines if the request 121 is from the owning user, from a user in the owning user's group, or from some other user. Responsive to this determination, the file server 110 uses one of the user permissions, the group permissions, or the other permissions, to determine whether to allow the request 121.

NT security style uses security IDs (SIDs) to identify both users and groups. NT security style associates the following access control limits with each file:

an SID for the owner;

an SID for the owner's group;

an ACL (access control list).

The NT ACL includes one or more ACEs (access control entries), each of which includes an SID indicating the user or group to which it applies, and a set of permissions. NT security style provides for the three Unix permissions (read, write, or execute), as well as "CHANGE PERMISSIONS" permission, "TAKE OWNERSHIP" permission, "DELETE" permission, "DELETE CHILD" permission, and other permissions.

NT security style is supported by the CIFS ("Common Internet File System") protocol. NT security style is further described in the following articles: R. Reichel, "Inside Windows NT Security", Windows/DOS Developers' Journal (April & May 1993), and in Stephen Sutton, "Windows NT Security Guide" (ISBN 0201419696).

CIFS is a session-based protocol, so the NT client device 120 transmits the NT user name and password to the file server 110 at a session connect time, from which the SIDs for the user and the user's groups are determined. The file server 110 can attempt to authenticate the user itself, or (preferably) forward the NT user name and password to an NT primary domain controller.

To enforce file access control using NT security style, the file server 110 determines the SID for the user and the user's group, for the user making the request 121. The file server 110 accumulates permissions granted to that user from ACEs that apply, then subtracts permissions specifically denied to that user. Responsive to this accumulation and subtraction, the file server 110 determines whether to allow the request 121.

Although a preferred embodiment of the invention is described with regard to Unix security style and NT security style, the invention can readily be used with other access control models, such as the "POSIX ACL" access control model supported by some Unix devices, and by some other operating systems. The concepts and features of the invention described herein can readily be used in a file server 110 supporting the "POSIX ACL" access control model in addition to or instead of the access control models described in detail herein, without further invention or undue experimentation. Accordingly, the scope and spirit of the invention includes such file servers and methods for their use.

The file server 110 designates each file 112 maintained in its file system 111 as having one specific access control model out of the plurality of access control models it supports. In a preferred embodiment, each file 112 is designated to use either Unix security style or NT security style. The file server 110 enforces the designated security style for each file 112 for all attempts to access that file 112. Thus, the file server 110 enforces the designated security style for all requests 121 made for that target file 112, whether those requests 121 come from Unix devices or NT devices, and whether those requests 121 use the NFS file server protocol or the CIFS file server protocol.

Access Control Enforcement

If the file server 110 receives a request 121 for a target file 112, and the request 121 matches the security style target file 112, the file server 110 validates the request 121 against access control limits for that file 112 imposed by that security style.

The file server 110 thus recognizes and enforces at least the following circumstances:

NT security style. The file 112 has NT security style and has a corresponding set of access control limits (an NT ACL), which has been set by a client device 120 using the CIFS file server protocol.

If a client device 120 makes a request 121 to access the file 112 using the CIFS file server protocol, the file server 110, if it is able to, enforces the NT ACL using NT security style.

If the file server 110 is able to determine the NT user, either by communication with an NT domain controller, or by reference to an NT user SID (security ID) database, the file server 110 is able to enforce the NT ACL using NT security style.

If the file server 110 is not able to determine the NT user, it determines the equivalent Unix user, using a UID for a Unix user recorded for the CIFS file server protocol session, and enforces the NT ACL as if the request 121. came from that Unix user.

Unix security style. The file 112 has Unix security style and has a corresponding set of access control limits (Unix Perms), which have been set by a client device 120 using the NFS file server protocol.

If a client device 120 makes a request 121 to access the file 112 using the NFS file server protocol, the file server 110 enforces the Unix Perms using Unix security style.

However, the file server 110 can also receive a request 121 that does not match the security style for the target file 112. The file server 110 can enforce the security style for the target file 112 against a non-matching client device 120 by validating either (1) a translated user ID for the client device 120 or (2) a translated set of access control limits for that file 112. As described herein, the file server 110 validates translated user IDs for all Unix security style files 112, and preferably validates translated user IDs for NT security style files 112 (when possible). Moreover, when the file server 110 validates translated access control limits for the file 112, the translated access control limits are not recomputed for each request 121, but are cached with the file 112 for reuse.

The file server 110 thus also recognizes and enforces at least the following circumstances:

NT security style. The file 112 has NT security style and has a corresponding set of access control limits (an NT ACL), which has been set by a client device 120 using the CIFS file server protocol.

If a client device 120 makes a request 121 to access the file 112 using the NFS file server protocol, the file server 110 determines the Unix user, associated with the client device 120, that is making the request 121. The Unix user has a UID (user ID).

In a preferred embodiment, the file server 10 maps the Unix user into an equivalent NT user. The file server 10 translates the UID into an SID (security ID) that is an equivalent user to the Unix user. The file server 110 enforces the access control limits (the NT ACL) for the equivalent NT user (the SID).

The file server 110 performs the following process to map the Unix user into an equivalent NT user:

The client device 120 contacts the file server 110 using the NFS file server protocol. The NFS file server protocol request 121 includes a UID for the Unix user associated with the client device 120.

The file server 110 looks up the UID in the Unix password file (/etc/passwd), and thus identifies the Unix user name for the Unix user. The Unix user name is an alphanumeric string identifying the Unix user.

The file server 110 translates the Unix user name into an NT user name using a selected mapping file. Similar to the Unix user name, the NT user name is an alphanumeric string identifying the NT user. If there is no such translation for the Unix user name, the file server 110 uses the Unix user name, without translation, as the NT user name.

In a preferred embodiment, the mapping file includes a set of records each identifying an NT user by NT user name, and associating an equivalent Unix user name with the NT user name.

The file server 110 contacts an NT domain controller to determine an SID for the NT user name. If there is no such NT user, the file server 110 uses a selected parameter for unmapped Unix users. In a preferred embodiment, this selected parameter is set to the NT user "guest" by default.

The file server 110 contacts the NT domain controller to obtain the SIDs of all groups for which the NT user is a member.

The file server 110 caches UID-to-SID mappings for a period of time, preferably about a few hours.

In an alternative preferred embodiment, or if the file server 110 is unable to map Unix users to NT users (for example, if domain authentication has been turned off), the file server 110 maps the NT ACL into a no less restrictive set of Unix Perms. The file server 110 determines these Unix Perms in response to the NT ACL and in response to the Unix user. The file server 10 enforces the mapped access control limits (the Unix Perms) for the actual Unix user (the UID).

The file server 110 might perform dynamic permission mapping, in which the file server 110 maps the NT ACL into a set of Unix Perms at the time the mapping is required. In a preferred embodiment, the file server 110 caches the translated Unix Perms with the file 112. Accordingly, for validating access control limits, the file server 110 performs static permission mapping, in which the file server 110 maps the NT ACL into a set of Unix Perms at the time the NT ACL is set.

The file server 110 performs the following process to achieve static permission mapping:

The file server 110 determines the NT user that is the owner of the file 112, and maps the NT user into an equivalent Unix user (the file server 110 maps the SID for the NT user into a UID for a Unix user).

The file server 110 examines the NT ACL for the file 112 and determines whether there are any "deny access" provisions.

If the NT ACL for the file 112 has no "deny access" provisions, the file server 110 generates a set of Unix Perms having an entry for "user permissions," consistent with the file access control limits provided by the NT ACL. The file server 110 sets the Unix Perms for "group permissions" equal to the Unix Perms for "other permissions." The file server 110 sets the Unix Perms for "other permissions" equal to the NT ACL entry for "everyone," if one exists.

If the NT ACL for the file 112 does have "deny access" provisions, the file server 110 rejects the request 121.

Because static permission mapping is not responsive to the particular user making the request 121, the file server 110 does not attempt to determine what the provisions of the NT ACL are for that particular user.

Unix security style. The file 112 has Unix security style and has a corresponding set of access control limits (Unix Perms), which have been set by a client device 120 using the NFS file server protocol If a client device 120 makes a request 121 to access the file 112 using the CIFS file server protocol, the file server 110 determines the NT user, associated with the client device 120, that is making the request 121. The NT user has an SID (session ID).

The file server 110 maps the NT user into an equivalent Unix user. The file server 110 translates the SID into a UID that is an equivalent user to the NT user. The file server 110 enforces the access control limits (the Unix Perms) for the equivalent Unix user (the UID).

The file server 110 performs the following process to map the NT user into an equivalent Unix user:

The client device 120 starts a CIFS session (the client device 120 first contacts the file server 110 using the CIFS file server protocol). The client device 120 transmits its NT user name to the file server 110.

The file server 110 translates the NT user name into a Unix user name using a mapping file. If there is no such translation for the NT user name, the file server 110 uses the NT user name, without translation, as the Unix user name.

The file server 110 looks up the Unix user name in the Unix password file (/etc/passwd), and thus identifies the Unix user, the UID for the Unix user, the Unix user's primary group, and the primary GID (group ID) for the Unix user. If there is no such Unix user name in the Unix password file, the file server 110 uses a selected parameter for unmapped NT users. In a preferred embodiment, this selected parameter is set to the Unix user "nobody" by default.

The file server 110 looks up the Unix user name in the Unix group file (/etc/groups) to determine any other groups and any other GIDs associated with the Unix user.

Reading and Modifying Access Control Limits

Each file 112 has its security style set by the file server 110 so that either (a) a request 121 to perform an operation on the file 112, or (b) a request 121 to perform an operation that sets the access control limits for the file 112, produce expected results.

When the file 112 is first created, the file server 110 sets the security style for the file 112 equal to a security style associated with the file server protocol used to create it. (This is limited by restrictions imposed by access control trees, described herein.) Thus, if the file 112 is created using the NFS file server protocol, the security style for the file 1.12 is set to Unix security style. Similarly, if the file 112 is created using the CIFS file server protocol, the security style for the file 112 is set to NT security style.

When the file 112 has its access control limits modified, the file server 110 sets the security style for the file 112 equal to a security style associated with the new access control limits. (This is limited by restrictions imposed by access control trees, described herein.) Thus, if a client device 120 sets a set of Unix Perms for the file 112, the security style for the file 112 is set to Unix security style. Similarly, if a client device 120 sets an NT ACL for the file 112, the security style for the file 112 is set to NT security style.

The file server 110 can receive a request 121 to read or view the access control limits for a file 112. Also, when the file server 110 receives a request 121 to make an incremental change to the access control limits for a file 112, it determines the current access control limits for the file 112 before making the incremental change.

The file server 110 thus recognizes and enforces at least the following circumstances:

NT security style. The file 112 has NT security style and has a corresponding set of access control limits (an NT ACL), which has been set by a client device 120 using the CIFS file server protocol.

If a client device 120 makes a request 121 to read or modify the access control limits for the file 112 using the NFS file server protocol, the file server 110 determines the Unix user, associated with the client device 120, that is making the request 121.

The file server 110 performs the same process to map an NT ACL into a set of Unix Perms as described above for validation of file access control, with the following exceptions:

Unlike validation of access control limits, the file server 110 treats translation of access control limits differently for requests 121 to read or modify the access control limits for the file 112.

Preferably, the file server 110 performs dynamic permission mapping, in which the file server 110 maps the NT ACL into a set of Unix Perms at the time the mapping is required. NT security style is richer than Unix security style-for example, Unix security style has no "deny access" provisions. Thus, it is possible for the file server 110 to map the NT ACL into a set of Unix Perms that appears different for different Unix users. For example, if the NT ACL, for a file 112 whose owner is Charles, specifically provides read access to Allen but specifically denies read access to Beth, the file server 110 will provide different Unix perms to each of the users Allen and Beth. One set will allow read access by Allen's group and one set will disallow read access by Beth's group, in harmony with the access provided by the actual NT ACL.

The file server 110 performs the following process to achieve dynamic permission mapping:

The file server 110 determines the NT user that is the owner of the file 112, and maps the NT user into an equivalent Unix user (the file server 110 maps the SID for the NT user into a UID for a Unix user).

The file server 110 examines the NT ACL for the file 112 and determines whether there are any "deny access" provisions.

If the NT ACL for the file 112 has no "deny access" provisions, the file server 110 generates a set of Unix Perms having entries for "user permissions" and "other permissions," consistent with the file access control limits provided by the NT ACL. The file server 110 sets the Unix Perms for "group permissions" equal to the Unix Perms for "other permissions."

If the NT ACL for the file 112 does have "deny access" provisions, the file server 110 attempts to determine if any apply to the particular Unix user. If the file server can tell, it generates a set of Unix Perms that reflect the access control limits currently available for this particular file 112 and this particular Unix user. If the file server 110 cannot tell, it rejects the request 121. (Alternatively, the file server 110 could reject the request 121 if there are any "deny access" provisions in the NT ACL.)

In alternative embodiments, the file server 110 may perform static permission checking, similar to validation of access control limits, for requests 121 to read or modify the access control limits for the file 112.

If the request 121 attempts to modify attributes of the file 112 that have no effect on access control limits for the file 112 (such as access time or modify time), the file server 110 makes those modifications without change to the access control limits for the file 112.

If the request 121 attempts to modify some but not all access control limits for the file 112, the file server 110 generates a set of Unix Perms in response to the NT ACL for the file 112, as described above. The file server 110 modifies the generated Unix Perms as specified by the request 121. If the file server 110 cannot generate a set of Unix Perms in response to the NT ACL for the file 112, the file server 110 rejects the request 121.

One difference in setting access control limits is that, according to NT security style, files 112 can be specifically set to be "READ-ONLY." According to Unix security style, files are set to be read only by clearing the WRITE permission for the owner of the file 112. When a client device 120 using the CIFS file server protocol attempts to set the READ-ONLY attribute of a file 112 with Unix security style, the file server 110 clears the WRITE permission for the owner of the file 112 in the Unix Perms for that file 112.

Unix security style. The file 112 has Unix security style and has a corresponding set of access control limits (Unix Perms), which have been set by a client device 120 using the NFS file server protocol The file server 110 performs the following process to map a set of Unix Perms into an NT ACL for display or modification of those Unix Perms by a CIFS client device 120:

The file server 110 generates an NT ACL entry for "owner," providing the same access control limits as the Unix Perms entry for "user permissions."

The file server 110 generates an NT ACL entry for "everyone," providing the same access control limits as the Unix Perms entry for "other permissions."

If possible, the file server 110 generates an NT ACL entry for the actual requesting user, providing the same access control limits as the Unix Perms entry for that user. This step could require mapping the Unix user into an equivalent NT user using the UID-to-SID cache.

Similar to modification of an NT ACL entry by a Unix user, if the request 121 (for modification of Unix Perms by an NT user) attempts to modify attributes of the file 112 that have no effect on access control limits for the file 112, the file server 110 makes those modifications without change to the access control limits for the file 112.

If the request 121 attempts to modify some but not all access control limits for the file 112, the file server 110 generates an NT ACL in response to the set of Unix Perms for the file 112, as described above. The file server 110 modifies the generated NT ACL as specified by the request 121.

Access Control Subtrees

In a preferred embodiment, the files 112 in the file system 111 are organized into a tree, having a set of branch nodes and a set of leaf nodes. One branch node of the tree is a root node, and each branch node of the tree is a root node for a subtree of the tree. In the file system 111, each branch node is a directory, and each leaf node is a file 112. A directory is a type of file 112 that includes information about those branch nodes and leaf nodes in a subtree for which it is the root node.

The file server 110 associates a limited set of access control models with each subtree. In a preferred embodiment in which the file server 110 supports Unix security style and NT security style, the file server 110 designates each subtree as being NT-only format, Unix-only format, or mixed format.

NT-only Format

When the file server 110 designates a subtree as being NT-only format, it restricts creation of files 112 within that subtree to files 112 having NT security style. The file server 110 also prohibits changing the access control model of files 112 within that subtree to other than NT security style.

According to NT security style, new files 112 inherit NT ACL settings from their parent nodes. If a client device 120 using the NFS file server protocol attempts to create a file 112 in a subtree having NT-only format, that file 112 can only be created by the Unix user equivalent to the NT user who is the NT-owner of the root node of the subtree. The file server 110 determines if the Unix user making the request 121 is the equivalent by (a) mapping the SID for the NT user who is the owner into an equivalent UID; (b) storing that UID in its record for the file 112; and (c) comparing that UID with the LID in the request 121.

According to NT security style, there is a particular "DELETE" permission and a particular "DELETE-CHILD" permission. If the file server 110 is unable to determine if a Unix user has these permissions, it rejects requests 121 to delete files 112 in NT-only format subtrees, unless the request 121 is from the owner of the file 112 (the equivalent Unix user of the NT user who is the owner) or the Unix user "root".

According to NT security style, there is a particular "CHANGE-PERMISSION" permission and a particular "TAKE-OWNER" permission. If the file server 110 is unable to determine if a Unix user has these permissions, it denies requests 121 to set any permissions for files 112 in a NT-only format subtree, unless the request 121 is from the owner of the file 112 (the equivalent Unix user of the NT user who is the owner) or the Unix user "root".

Unix-only Format

Similarly, when the file server 110 designates a subtree as being Unix-only format, it restricts creation of files 111 within that subtree to files 111 having Unix security style. The file server 110 also prohibits changing the access control model of files 111 within that subtree to other than Unix security style. Attempts to set an NT ACL would change the access control model for that file 112 to NT security style, and so are rejected in a Unix-only format subtree.

When a client device 120 using the CIFS file server protocol creates a file 112 in a Unix-only format subtree, the file server 110 sets the owner of the file 112 to the Unix user equivalent to the NT user making the request 121. The file server 110 maps the SID for the NT user to a UID for an equivalent Unix user, and uses that UID to set the owner of the file 112.

According to Unix security style, there is no "CHANGE-PERMISSION" permission or "TAKE-OWNER" permission. The file server 110 always denies requests 121 to set these permissions for files 112 in a Unix-only format subtree.

Mixed Format

When the file server 110 designates a subtree as being mixed format, it allows creation of files 111 with either Unix security style or NT security style. The file server 110 does not prohibit changing the access control model of files 111 within that subtree to either Unix security style or NT security style.

An administrator for the file server 110 can change the designation of a subtree from a first format to a second format (for example, from mixed format to either NT-only format or Unix-only format). When the second format is possibly incompatible with the first format (for example, a subtree changed to NT-only format includes nodes that are Unix security style), the file server 110 converts those files 112 with incompatible access control models as it sets permissions for those files 112. Requests 121 for a file 112 which only check permissions are still validated using the access control model in place for the file 112.

Although the invention is described herein with regard to only two access control models, the invention can readily be used with three or more access control models. In such alternative embodiments, there are a larger number of possible subtree formats, including subtree formats that restrict the files 112 within that subtree to one of a set of multiple access control models, less than the set of all access control models recognized by the file server 110.

In a preferred embodiment, the root node of the file system 111 is designated as having mixed format. Client devices 120 that are owners of a subtree can modify the format of a subtree by request 121 to the file server 110; thus, client devices 120 can modify subtrees to have NT-only format, Unix-only format, mixed format. When a new subtree is created, the file server 110 designates the new subtree as having the same format as its parent; thus, mixed format if it is created within a subtree that is already mixed format (the default), NT-only format if it is created within a subtree that is already NT-only format, and Unix-only format if it is created within a subtree that is already Unix-only format.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method of operating a file server, said method including steps for
   identifying a first file on said file server with a first security style selected from among a plurality of security styles; and
   enforcing said first security style for all accesses to said file server;
   wherein said steps for enforcing include steps for
      recognizing a first set of permissions associated with said first file in said first security style;
      defining a first user type associated with said firsts security style;
      translating a user from a second user type associated with a second security style into said first user type; and
      enforcing a file server request from said second user type using said first user type and said first set of permissions.

2. A method as in claim 1, wherein said steps for translating are performed with regard to access control limits applicable to said first file at a time of said steps for enforcing.

3. A method as in claim 1, wherein said steps for translating are performed with regard to access control limits applicable to said first file at a time said access control limits are set.

4. A method as in claim 1, further comprising the step of caching the translation.

5. A method as in claim 4, wherein the steps for recognizing, defining, translating and caching can be performed statically at a time that said access control limits are either set of reset.

6. A method of operating a file server, said method including steps for
   identifying a first file on said file server with a first security style selected from among a plurality of security styles corresponding to a plurality of operating systems implemented on said file server; and
   enforcing said first security style for all accesses to said first file;
   wherein said steps for enforcing include steps for
      translating a first set of permissions associated with said first file in said first security style to a second set of permissions in a second security style, wherein said second set of permissions is no less restrictive that said first set of permissions; and
      enforcing a file server request in said second security style using said second set of permissions.

7. A method as in claim 6, wherein said steps for translating are performed with regard to access control limits applicable to said first file at a time of said steps for enforcing.

8. A method as in claim 6, wherein said steps for translating are performed with regard to access control limits applicable to said first file at a time said access control limits are set.

9. A method as in claim 6, further comprising steps for caching the translation.

10. A method as in claim 9, wherein steps for translating are performed dynamically and occur approximately when the steps for enforcing take place.

11. A method as in claim 9, wherein said steps for translating are performed statically and occur approximately when said access control limits are set or reset.

12. A method of operating a file server, said method including steps for
identifying a first file on said file server with a first security style selected from among a plurality of security styles corresponding to a plurality of operating systems;
enforcing said first security style for all accesses to said file server; and
identifying said first file with a second security style selected from among the plurality of security styles in response to a file server request;
wherein said steps for identifying include steps for translating a first set of permissions associated with said first file in said first security style to a second set of permissions in said second security style, wherein said second set of permissions is no less restrictive than said first set of permissions.

13. A method as in claim 12, wherein the steps for translating include mapping NT access control limits into a no less restrictive set of Unix Perms.

14. A method as in claim 12, wherein the steps for translating include mapping a set of Unix Perms into a set of no less restrictive NT access control limits.

15. A file server including
a set of files available on said file server, each said file having an associated security style selected from among a plurality of security styles corresponding to a plurality of operating systems available on said file server;
wherein said file server enforces said associated security style for all accesses to said file;
wherein said file server is capable of altering the security style associated with said file in response to a file server request; and
wherein said file server is capable of translating a first set of permissions associated with said file in a first security style to a second set of permissions in a second security style, wherein said second set of permissions is no less restrictive than said first set of permissions.

16. A file server comprising
interfaces to one or more client devices;
a file system;
a processor operating under program control to cause the file server to perform file server operations on the file system and to communicate with the client devices; and
storage for the program control, the program control comprising steps for (a) identifying a first file on said file server with a first security style selected from among a plurality of security styles, and (b) enforcing said first security style for all accesses to said file server, wherein said steps for enforcing include steps for (c) recognizing a first set of permissions associated with said first file in said first security style, (d) defining a first user type associated with said firsts security style, (e) translating a user from a second user type associated with a second security style into said first user type, and (f) enforcing a file server request from said second user type using said first user type and said first set of permissions.

17. A file server as in claim 16, wherein said steps for translating are performed with regard to access control limits applicable to said first file at a time of said steps for enforcing.

18. A file server as in claim 16, wherein said steps for translating are performed with regard to access control limits applicable to said first file at a time said access control limits are set.

19. A file server as in claim 16, wherein the program control further comprises steps for caching the translation.

20. A file server as in claim 19, wherein the steps for recognizing, defining, translating and caching can be performed statically at a time that said access control limits are either set of reset.

21. A file server comprising
interfaces to one or more client devices;
a file system;
a processor operating under program control to cause the file server to perform file server operations on the file system and to communicate with the client devices; and
storage for the program control, the program control comprising steps for (a) identifying a first file on said file server with a first security style selected from among a plurality of security styles corresponding to a plurality of operating systems implemented on said file server, and (b) enforcing said first security style for all accesses to said first file, wherein said steps for enforcing include steps for (c) translating a first set of permissions associated with said first file in said first security style to a second set of permissions in a second security style, wherein said second set of permissions is no less restrictive that said first set of permissions, and (d) enforcing a file server request in said second security style using said second set of permissions.

22. A file server as in claim 21, wherein said steps for translating are performed with regard to access control limits applicable to said first file at a time of said steps for enforcing.

23. A file server as in claim 21, wherein said steps for translating are performed with regard to access control limits applicable to said first file at a time said access control limits are set.

24. A filer server as in claim 21, wherein the program control further comprises steps for caching the translation.

25. A file server as in claim 24, wherein steps for translating are performed dynamically and occur approximately when the steps for enforcing take place.

26. A file server as in claim 24, wherein said steps for translating are performed statically and occur approximately when said access control limits are set or reset.

27. A file server comprising
interfaces to one or more client devices;
a file system;
a processor operating under program control to cause the file server to perform file server operations on the file system and to communicate with the client devices; and
storage for the program control, the program control comprising steps for (a) identifying a first file on said file server with a first security style selected from among a plurality of security styles corresponding to a plurality of operating systems, (b) enforcing said first security style for all accesses to said file server, and (c) identifying said first file with a second security style selected from among the plurality of security styles in response to a file server request, wherein said steps for identifying include steps for translating a first set of permissions associated with said first file in said first security style to a second set of permissions in said second security style, and wherein said second set of permissions is no less restrictive than said first set of permissions.

28. A file server as in claim 27, wherein the steps for translating include mapping NT access control limits into a no less restrictive set of Unix Perms.

29. A file server as in claim 27, wherein the steps for translating include mapping a set of Unix Perms into a set of no less restrictive NT access control limits.

30. Storage for instructions, the instructions executable by a processor to perform file server operations, the instructions comprising steps for identifying a first file on said file server with a first security style selected from among a plurality of security styles; and enforcing said first security style for all accesses to said file server;

wherein said steps for enforcing include steps for recognizing a first set of permissions associated with said first file in said first security style;

defining a first user type associated with said firsts security style;

translating a user from a second user type associated with a second security style into said first user type; and enforcing a file server request from said second user type using said first user type and said first set of permissions.

31. Storage as in claim 30, wherein said steps for translating are performed with regard to access control limits applicable to said first file at a time of said steps for enforcing.

32. Storage as in claim 30, wherein said steps for translating are performed with regard to access control limits applicable to said first file at a time said access control limits are set.

33. Storage as in claim 30, wherein the program control further comprises steps for caching the translation.

34. Storage as in claim 33, wherein the steps for recognizing, defining, translating and caching can be performed statically at a time that said access control limits are either set of reset.

35. Storage for instructions, the instructions executable by a processor to perform file server operations, the instructions comprising steps for identifying a first file on said file server with a first security style selected from among a plurality of security styles corresponding to a plurality of operating systems implemented on said file server; and enforcing said first security style for all accesses to said first file;

wherein said steps for enforcing include steps for translating a first set of permissions associated with said first file in said first security style to a second set of permissions in a second security style, wherein said second set of permissions is no less restrictive that said first set of permissions; and enforcing a file server request in said second security style using said second set of permissions.

36. Storage as in claim 35, wherein said steps for translating are performed with regard to access control limits applicable to said first file at a time of said steps for enforcing.

37. Storage as in claim 35, wherein said steps for translating are performed with regard to access control limits applicable to said first file at a time said access control limits are set.

38. Storage as in claim 35, wherein the instructions further comprises steps for caching the translation.

39. Storage as in claim 38, wherein steps for translating are performed dynamically and occur approximately when the steps for enforcing take place.

40. Storage as in claim 38, wherein said steps for translating are performed statically and occur approximately when said access control limits are set or reset.

41. Storage for instructions, the instructions executable by a processor to perform file server operations, the instructions comprising steps for identifying a first file on said file server with a first security style selected from among a plurality of security styles corresponding to a plurality of operating systems;

enforcing said first security style for all accesses to said file server; and identifying said first file with a second security style selected from among the plurality of security styles in response to a file server request;

wherein said steps for identifying include steps for translating a first set of permissions associated with said first file in said first security style to a second set of permissions in said second security style; and wherein said second set of permissions is no less restrictive than said first set of permissions.

42. Storage as in claim 41, wherein the steps for translating include mapping NT access control limits into a no less restrictive set of Unix Perms.

43. Storage as in claim 41, wherein the steps for translating include mapping a set of Unix Perms into a set of no less restrictive NT access control limits.

44. A method of operating a file server, said method including steps of identifying a first file on said file server with a first security style selected from among a plurality of security styles; and enforcing said first security style for all accesses to said file server;

wherein said steps of enforcing include steps of recognizing a first set of permissions associated with said first file in said first security style;

defining a first user type associated with said firsts security style;

translating a user from a second user type associated with a second security style into said first user type; and enforcing a file server request from said second user type using said first user type and said first set of permissions.

45. A method as in claim 44, wherein said steps of translating are performed with regard to access control limits applicable to said first file at a time of said steps of enforcing.

46. A method as in claim 44, wherein said steps of translating are performed with regard to access control limits applicable to said first file at a time said access control limits are set.

47. A method as in claim 44, further comprising the step of caching the translation.

48. A method as in claim 47, wherein the steps of recognizing, defining, translating and caching can be performed statically at a time that said access control limits are either set of reset.

49. A method of operating a file server, said method including steps of identifying a first file on said file server with a first security style selected from among a plurality of security styles corresponding to a plurality of operating systems implemented on said file server; and enforcing said first security style for all accesses to said first file;

wherein said steps of enforcing include steps of
translating a first set of permissions associated with said first file in said first security style to a second set of permissions in a second security style, wherein said second set of permissions is no less restrictive that said first set of permissions; and enforcing a file server request in said second security style using said second set of permissions.

50. A method as in claim 49, wherein said steps of translating are performed with regard to access control limits applicable to said first file at a time of said steps of enforcing.

51. A method as in claim 49, wherein said steps of translating are performed with regard to access control limits applicable to said first file at a time said access control limits are set.

52. A method as in claim 49, further comprising steps of caching the translation.

53. A method as in claim 52, wherein steps of translating are performed dynamically and occur approximately when the steps of enforcing take place.

54. A method as in claim 52, wherein said steps of translating are performed statically and occur approximately when said access control limits are set or reset.

55. A method of operating a file server, said method including steps of identifying a first file on said file server with a first security style selected from among a plurality of security styles corresponding to a plurality of operating systems;

enforcing said first security style for all accesses to said file server; and identifying said first file with a second security style selected from among the plurality of security styles in response to a file server request;

wherein said steps of identifying include steps of translating a first set of permissions associated with said first file in said first security style to a second set of permissions in said second security style, wherein said second' set of permissions is no less restrictive than said first set of permissions.

56. A method as in claim 55, wherein the steps of translating include mapping NT access control limits into a no less restrictive set of Unix Perms.

57. A method as in claim 55, wherein the steps of translating include mapping a set of Unix Perms into a set of no less restrictive NT access control limits.

58. A file server comprising means for identifying a first file on said file server with a first security style selected from among a plurality of security styles; and means for enforcing said first security style for all accesses to said file server;

wherein said means for enforcing include
means for recognizing a first set of permissions associated with said first file in said first security style;
means for defining a first user type associated with said firsts security style;
means for translating a user from a second user type associated with a second security style into said first user type; and
means for enforcing a file server request from said second user type using said first user type and said first set of permissions.

59. A file server comprising means for identifying a first file on said file server with a first security style selected from among a plurality of security styles corresponding to a plurality of operating systems implemented on said file server; and means for enforcing said first security style for all accesses to said first file;

wherein said means for enforcing include
means for translating a first set of permissions associated with said first file in said first security style to a second set of permissions in a second security style, wherein said second set of permissions is no less restrictive that said first set of permissions; and
means for enforcing a file server request in said second security style using said second set of permissions.

60. A file server comprising means for identifying a first file on said file server with a first security style selected from among a plurality of security styles corresponding to a plurality of operating systems;

means for enforcing said first security style for all accesses to said file server; and means for identifying said first file with a second security style selected from among the plurality of security styles in response to a file server request;

wherein said means for identifying include means for translating a first set of permissions associated with said first file in said first security style to a second set of permissions in said second security style, wherein said second set of permissions is no less restrictive than said first set of permissions.

* * * * *